Figure 1:
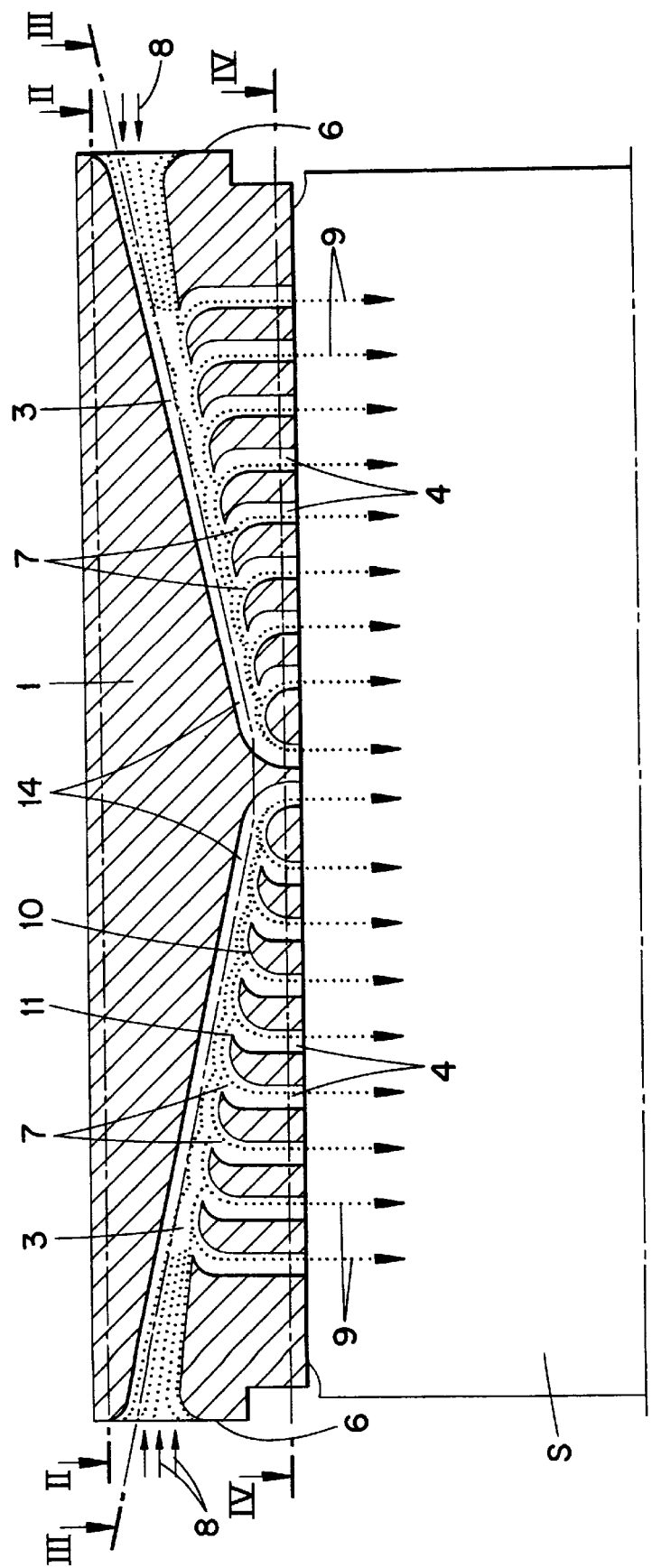

United States Patent

Ramm-Schmidt et al.

[11] Patent Number: 5,904,807
[45] Date of Patent: May 18, 1999

[54] LIQUID DISTRIBUTOR FOR AN EVAPORATOR

[75] Inventors: Leif Ramm-Schmidt, Kirkkonummi; Hemmo Eriksson, Vantaa; Peter Koistinen, Espoo; Veli Tiainen, Klaukkala, all of Finland

[73] Assignee: Hadwaco Ltd. Oy, Helsinki, Finland

[21] Appl. No.: 08/809,775

[22] PCT Filed: Sep. 26, 1995

[86] PCT No.: PCT/FI95/00524

§ 371 Date: May 29, 1997

§ 102(e) Date: May 29, 1997

[87] PCT Pub. No.: WO96/09872

PCT Pub. Date: Apr. 4, 1996

[30] Foreign Application Priority Data

Sep. 27, 1994 [FI] Finland ..................... 944471

[51] Int. Cl.⁶ ................. B01D 1/30; B01D 3/00
[52] U.S. Cl. ............ 159/43.1; 159/15; 159/26.2; 165/147; 202/239
[58] Field of Search .................. 202/239, 237, 202/270, 236, 182; 159/43.2, 115, 14, 26.2, 43.1, 27.4; 165/100, 147

[56] References Cited

U.S. PATENT DOCUMENTS

| | | | |
|---|---|---|---|
| 709,297 | 9/1902 | Bender | 159/26.2 |
| 1,249,557 | 12/1917 | Truscott | 159/26.2 |
| 3,290,024 | 12/1966 | Huber | 261/88 |
| 3,794,056 | 2/1974 | Warren | 137/836 |
| 3,849,232 | 11/1974 | Kessler et al. | 159/13.2 |
| 4,277,425 | 7/1981 | Leva | 261/98 |
| 5,512,141 | 4/1996 | Koistenen et al. | |
| 5,755,924 | 5/1998 | Feres | 159/28.6 |
| 5,770,020 | 6/1998 | Koistinen et al. | 202/172 |

FOREIGN PATENT DOCUMENTS

| | | |
|---|---|---|
| 1 519 741 | 3/1970 | Germany . |
| 90/01977 | 3/1990 | WIPO . |
| 95/08381 | 3/1995 | WIPO . |

Primary Examiner—Virginia Manoharan
Attorney, Agent, or Firm—Burns, Doane, Swecker & Mathis, L.L.P.

[57] ABSTRACT

A liquid distributor in an evaporator, intended in particular for the evaporation treatment of liquid suspensions which contain fibers or other such solid ingredients. The distributor comprises, located at the upper end of the heat exchange surface, a transverse frame, liquid conduits disposed therein distributing the liquid over the entire width of the heat exchange surface. According to the invention the liquid conduits are made up of feed conduits slanted obliquely downwards and of distribution conduits branching out therefrom and leading to the heat exchange surface. At the branching points of the conduits their wall surfaces on the downstream side with respect to the feed flow are rounded into curved dividing surfaces by means of which the dividing of the flow is carried out. Respectively the branching points on the upstream side with respect to the feed flow are equipped with sharp feeding tips in such a manner that the flow will travel in the feed conduit in a cascade-like manner over the feeding tips to the dividing surfaces, which will cause a division of the flow substantially equally among the distribution conduits.

12 Claims, 2 Drawing Sheets

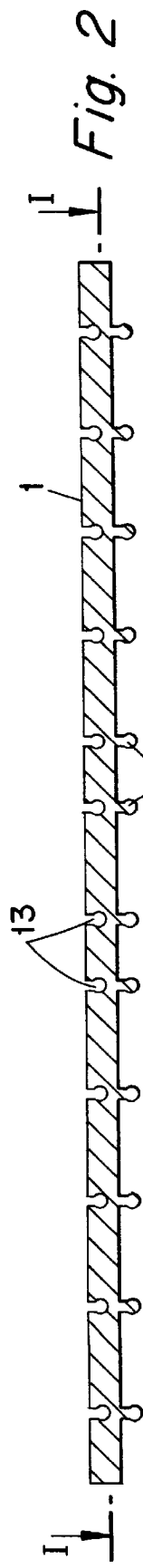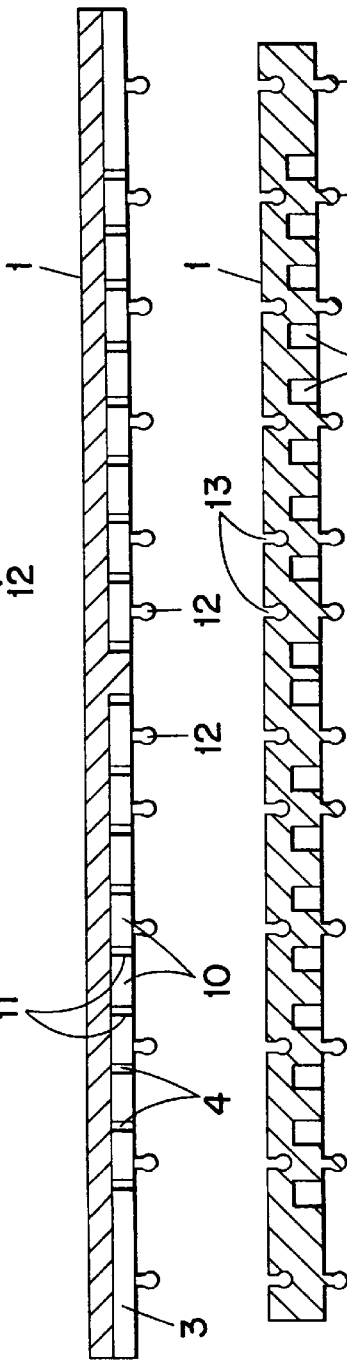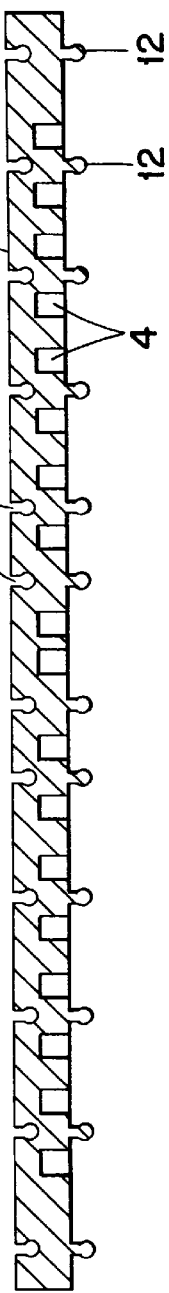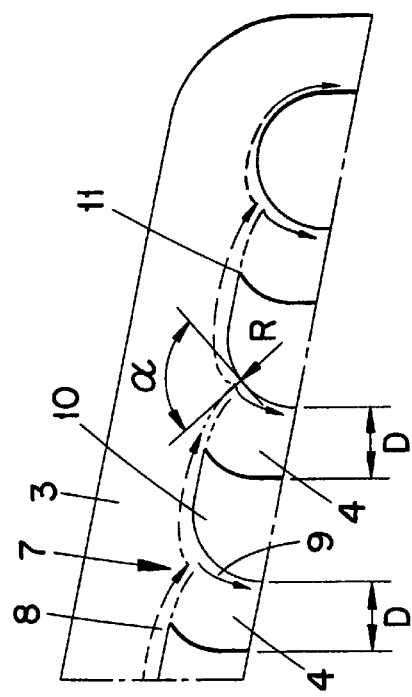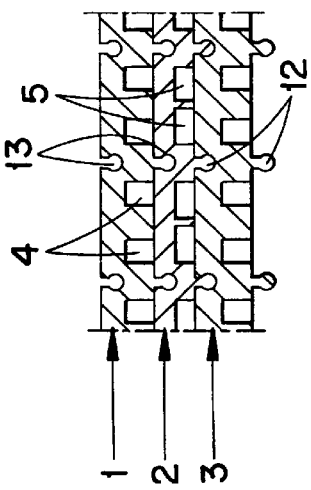

LIQUID DISTRIBUTOR FOR AN EVAPORATOR

TECHNICAL FIELD

The present invention relates to a liquid distributor in an evaporator, which distributor is intended in particular for liquid suspensions containing solid ingredients. The distributor includes at the upper end of the heat exchange surface a transverse conduit frame which includes liquid conduits for distributing over the entire width of the surface a liquid introduced from the side of the evaporator.

BACKGROUND OF THE INVENTION

In an evaporator in which the liquid flows as a thin film on the heat exchange surface, the surface should be covered with liquid throughout in order to achieve an efficient transfer of heat. When a liquid suspension which contains solid ingredients is being evaporated, increasing concentrations of solids at the boundaries of the dry and liquid-covered areas of the heat exchange surface would additionally cause very rapid soiling of the heat exchange surface. An even distribution over the heat exchange surface of the liquid to be evaporated is thus an absolute prerequisite for efficient operation of the evaporator.

The keeping of the heat exchange surface covered with liquid can be promoted by increasing the liquid amount fed onto the surface. However, this increases the consumption of energy for pumping and increases the thickness of the flowing liquid film, thus lowering the heat transfer coefficient. For this reason, very narrow liquid conduits have generally been resorted to in liquid distributors in evaporators, but such conduits tend to become clogged when solids-containing liquid suspensions are being evaporated.

From Finnish lay-open print 86961 there is known a heat exchanger intended for the evaporation of liquid, the heat exchanger having adjacently positioned bags formed from plastic membrane, the membrane surfaces of the bags serving as heat exchange surfaces. The liquid to be evaporated is introduced onto the outer surfaces of the bags from conduits adjacently positioned in honeycombs at the upper end of the evaporator and distributed over the entire width of the bags. The heating medium used is vapor directed via the same honeycombs to the inside of the bags, the vapor being vapor produced during evaporation and compressed in a compressor.

The apparatus described in FI publication 86961 is intended for the distillation of seawater. In addition, the publication mentions as an intended use of the apparatus the concentration of solutions and suspensions, such as bleaching effluents. However, in this case the apparatus has the deficiency that the fiber material and other solids present in the suspension tend to clog the obliquely oriented narrow liquid conduits in the honeycombs.

SUMMARY OF THE PRESENT INVENTION

An object of the present invention is to provide a liquid distributor for an evaporator; more particularly, a liquid distributor in which the problem of prior-art systems, the clogging of conduits by solids present in the suspension, is avoided. The liquid distributor of the present invention is therefore especially suitable for the treatment of wood-processing industry waste waters which contain fiber materials, such as the waste liquor from pulping or bleaching effluents, or for the treatment of food-industry waste waters which form carbonate, oxalate and other precipitates. The liquid distributor according to the invention is characterized in that it has an obliquely downwards slanted feed conduit and a plurality of distribution conduits branching out therefrom and leading to the heat exchange surface at each branching point of the feed conduit and a distribution conduit the common wall surface of the conduits, downstream relative to the feed flow, is rounded so that the dividing of the flow takes place on the curved dividing surface formed by the wall.

In a manner deviating from the oblique liquid conduits starting from the side of the evaporator in accordance with FI publication 86961, the liquid distributor according to the present invention comprises a common oblique feed conduit which divides the liquid into distribution conduits departing therefrom, which distribution conduits may be substantially vertical. The liquid to be evaporated flows in the feed conduit in a cascade-like manner from one dividing surface at a branching point of the conduits to another. The curved dividing surface divides the stream at a given point into a principal component which will continue forwards in the feed conduit and a component passing via the distribution conduit to the heat exchange surface. The dividing is regulated, for example, by the radius of curvature of the dividing surface and by the angle at which the feed conduit flow impinges upon the dividing surface. On the basis of preliminary experiments, it is possible, by regulating these parameters according to the type of the suspension to be evaporated, to accomplish a substantially equal division of the liquid among the distribution conduits. In addition, it has been observed that, in accordance with the objects of the invention, the curved dividing surfaces effectively control the tendency of the conduits to become clogged by solid ingredients of the suspension, for example by eliminating from the liquid flow path any sharp edges to which agglomerations of solids could adhere.

At a branching point, on the upstream side of the feed flow, i.e. on the side opposite to the curved dividing surface, the feed and distribution conduits are preferably delimited by wall surfaces terminating in a common sharp tip. The sharp tip constitutes a step from which the inflow of the feed conduit will jump over the mouth of the distribution conduit onto the dividing surface, where the dividing of the flow takes place. The distribution conduit wall surface which terminates in the tip may be rounded in a manner corresponding to the dividing surface.

In an evaporator intended for the treatment of a fiber suspension, the radius of curvature of the dividing surfaces may be, for example, within a range of approx. 10–30 mm, preferably 20–30 mm, and the width of the distribution conduits may vary within a range of approx. 10–30 mm, preferably approx. 15–25 mm. The width of distribution conduits branching out from the feed conduit may be the same for all conduits, or it may increase progressively from the side of the evaporator towards its middle.

It is preferable to construct the liquid distributor according to the invention so that it comprises two mutually symmetrical feed conduits which start on the opposite sides of the evaporator and extend to the middle of the evaporator in such a manner that each feed conduit will feed liquid to its own half of the evaporator.

The liquid distributor according to the invention can be used in a heat exchanger of the type according to FI lay-open print 86961 to direct a liquid suspension to be evaporated onto the outer surfaces of bags of plastic membrane. The liquid distributor extending in the transverse direction from one side of the bag to the other in this case distributes the liquid over the entire width of the heat exchange surfaces of the bags. The vapor produced from the liquid may be directed to a compressor and from there, having been compressed to higher pressure and temperature, to the inside of the bags as heating vapor, which will recondense to liquid in the heat exchange process. However, the use of heating vapor produced in some other manner is equally possible.

The liquid distributor according to the invention can be constructed from two vertical wall elements which have been fabricated from, for example, plastic by injection molding, and between which the liquid conduits are formed. For example, in the above-mentioned heat exchanger comprising bags of plastic membrane, a wall element of the liquid distributor may at the same time serve to delimit vapor conduits leading to the inside of the bags on its opposite side. The feeding of liquid and vapor into the heat exchanger can thus be arranged by attaching to each other said elements, which will delimit, between them, alternately liquid conduits leading to the space between the bags and vapor conduits leading to the inside of the bags. Owing to the compact structure, the liquid conduits can be made maximally wide, which will also prevent their tendency to become clogged.

The invention is described below in greater detail with the help of examples, with reference to the accompanying drawings, in which FIG. 1 depicts a vertical section of a liquid distributor according to the invention, FIG. 2 depicts a wall element of the liquid distributor according to FIG. 1, in horizontal section II—II, of FIG. 1, FIG. 3 depicts a wall element of the liquid distributor according to FIG. 1, in horizontal section III—III of FIG. 1, FIG. 4 depicts a wall element of the liquid distributor according to FIG. 1, in horizontal section IV—IV of FIG. 1, FIG. 5 depicts a partial horizontal section of three wall elements attached one to another, the wall elements forming a distributor for both the liquid to be evaporated and for the heating vapor, and FIG. 6 depicts on a larger scale the branching points of the conduits of the liquid distributor according to FIG. 1.

The liquid distributor according to the invention for an evaporator comprises a conduit frame which is made up of two vertical wall elements 1, 2, for example, injection molded from a plastic material, these wall elements delimiting between themselves the liquid conduits 3, 4 of the distributor. The liquid conduits 3, 4 have been produced by forming, in connection with injection molding, recesses in the wall element 1 according to FIGS. 1–4 and by closing these on their open side by a second wall element 2 in accordance with FIG. 5. FIG. 5 additionally shows vapor conduits 5 closed by means of a wall element 1 according to FIGS. 1–4, which vapor conduits will be returned to in greater detail hereinafter.

The liquid conduits, which can best be seen in FIGS. 1 and 6, comprise a feed conduit 3 starting from the distributor end 6 located on the side of the evaporator, the feed conduit extending obliquely downwards to the middle of the distributor, and a plurality of substantially vertical distribution conduits 4 which branch out from the feed conduit at branching points 7 and lead to the heat exchange surface 5 of the evaporator. Starting from one end of the distributor, the width D (cf. FIG. 6) of the distribution conduits 4 branching out from the feed conduit 3 may be constant or grow progressively, conduit by conduit, towards the middle of the distributor. In its other half the distributor comprises a symmetrically corresponding system of liquid conduits made up of feed and distribution conduits 3, 4. The feed flow of the liquid to be evaporated, such as a suspension which contains solid fiber material, is directed in accordance with arrows 8 in FIG. 1 to the feed conduits 3, from where it is divided into partial flows according to arrows 9, into the distribution conduits 4 leading to the heat exchange surface, substantially equally among the distribution conduits. Thus the liquid can be distributed from the distribution conduits 4 evenly over the entire width of the heat exchange surface.

Via its end in the middle of the distributor, the feed conduit 3 communicates with the vapor spaces of the evaporator so that during operation the feed conduit is in part filled with vapor 14 formed during evaporation. It is necessary to regulate the feeding in of the liquid to be evaporated in such a manner that the feed conduit 3 is not in its entirety filled with liquid, because otherwise the produced siphon effect would hamper even distribution of the liquid.

The branching points 7 of the conduits and the division of the liquid flow at them into partial flows passing to the heat exchange surface is seen on a larger scale in FIG. 6. The feed flow traveling in the feed conduit 3 is indicated in the figure by numeral 8 and the partial flows separating into the distribution conduits 4 by numeral 9. At each branching point 7 of the conduits the wall surface common to the conduits, downstream relative to the feed flow 8, is formed into a curved dividing surface 10, the radius of which is indicated by R. At each branching point 7, on the upstream side the wall surface of the distribution conduit 4 is rounded correspondingly, and the wall surface of the conduit 4 and the wall surface of the feed conduit 3 together form a sharp feeding tip 11 from which the arriving feed flow 8 jumps over the end of the distribution conduit onto the dividing surface 10, on which the division of the flow takes place at each given point. The successive dividing surfaces 10, terminating in feeding tips 11, are dimensioned so that the feeding tip of a dividing surface lower in the direction of the flow is at each given point disposed a few millimeters below the theoretical continuation of the feeding tip of the next dividing surface upstream. The impinging angle of the flow 8 to the tangent of the dividing surface 10 is indicated in the figure by α. The division of the feed flow 8 into partial flows 9 depends on the composition of the liquid, on the radius R of curvature of the dividing surface, and on the impinging angle α, which in turn is dependent on, for example, the velocity of the flow and the width D of the distribution conduits 4, and the distribution may be regulated by varying the said values. According to preliminary experiments, during the operation of the distributor solid material adheres momentarily to the dividing surfaces 10 at the impinging points of the feed flow 8, but as the accumulation of material increases it either continues forward in the feed conduit 8 or falls into the distribution conduit, i.e. in operation the device is self-cleaning. The impinging angle α of the feed flow 8 is advantageously set close to a right angle, for example, within a range of approx. 90–110°.

As already pointed out above, the liquid conduits 3, 4 in the distributor are located in accordance with FIG. 5 between two wall elements 1, 2 fastened to each other. The locking of the elements 1, 2 to each other is effected by snap fastenings of vertical projections 12 in element 1 according to FIGS. 1–4 to corresponding recesses 13 in the other element 2. The heat exchange surface being of plastic membrane, the upper end of the membrane may be locked (not shown) between the elements 1, 2 fastened to each other.

The said second wall element 2 in FIG. 5 is designed so that, together with a third element, element 1 according to FIGS. 1–4, it delimits vertical vapor conduits 5 from which heating vapor is directed to that side of the heat exchange surface which is opposite to the liquid to be evaporated. When bags made of plastic membrane are used, the heating vapor is directed via conduits 5 to the inside of the bags and the liquid to be evaporated is directed via conduits 3, 4 onto the outer surfaces of the bags. By fastening elements 1, 2 according to FIG. 5, equipped with projections 12 and recesses 13, alternately one to another it is possible to construct a liquid and vapor distributor which has in alternation liquid conduits 4 leading to the spaces between the bags of plastic membrane and vapor conduits 5 which lead to the inside of the bags, the conduits distributing the liquid and the vapor evenly over the entire width of the heat exchange surfaces formed by the bags.

For an expert in the art it is clear that the various embodiments of the invention are not limited to that described above by way of example but may vary within the accompanying claims.

We claim:

1. A liquid distributor for use with an evaporator, to distribute liquid suspensions containing solid ingredients onto a heat exchange surface of the evaporator, said liquid distributor comprising a transverse conduit frame at an upper end of the heat exchange surface, said transverse conduit frame including liquid conduits for distributing a liquid over an entire width of the heat exchange surface, the liquid being fed in from an end of the distributor, wherein the liquid conduits of the liquid distributor include an obliquely downwards slanting feed conduit and a plurality of distribution conduits branching out therefrom at a plurality of points, each branching point of the feed conduit and the distribution conduit defining a common wall surface of the conduits, downstream relative to a feed flow, said common wall surface being rounded and forming a curved dividing surface so that a dividing of the flow takes place on the curved dividing surface.

2. A liquid distributor according to claim 1, wherein the feed and distribution conduits are delimited at each branching point on the feed flow upstream side by each of the respective wall surfaces terminating in a common sharp tip.

3. A liquid distributor according to claim 1, wherein a radius of curvature of the curved dividing surface at each of the branching points of the conduits in the evaporator intended for a fiber suspension is within a range of approximately 10–30 mm.

4. A liquid distributor according to claim 3, wherein the radius of curvature of the curve dividing surface is approximately 20–30 mm.

5. A liquid distributor according to claim 1, wherein the feed conduit begins at the end of the distributor, being oriented from there obliquely downwards, and the distribution conduits branching out from the feed conduit are disposed generally vertically relative thereto.

6. A liquid distributor according to claim 1, wherein the feed conduit comprises a first feed conduit and the distributor further comprises a second feed conduit symmetrically disposed relative to the first feed conduit, the two mutually symmetrical feed conduits beginning at opposite ends of the evaporator and extending to the middle of the evaporator in such a manner that each of the feed conduits feeds liquid to its respective half of the evaporator.

7. A liquid distributor according to claim 1, wherein a width of each of the distribution conduits in the evaporator intended for a fiber suspension is within a range of approximately 10–30 mm.

8. A liquid distributor according to claim 7, wherein the width of the distribution conduits is approximately 15–25 mm.

9. A liquid distributor according to claim 1, wherein a width of each of the distribution conduits branching out from the feed conduit increases progressively from the side of the evaporator towards the middle of the evaporator.

10. A liquid distributor according to claim 1, wherein the conduit frame includes two vertical wall elements which delimit between them the liquid conduits of the distributor.

11. A liquid distributor according to claim 10, wherein the wall elements are fabricated from plastic by injection molding.

12. A liquid distributor according to claim 10, wherein the distributor is for use further in a distiller, vapor generated during evaporation being condensed to liquid, and one of the wall elements of the distributor frame delimits on its opposite side vapor conduits from which vapor is fed to a condensation stage.

\* \* \* \* \*